United States Patent [19]

Dawson et al.

[11] Patent Number: 5,030,045

[45] Date of Patent: Jul. 9, 1991

[54] SCORED PANEL

[75] Inventors: John L. Dawson, N. Canton; David L. Bridges, New Philadelphia, both of Ohio

[73] Assignee: Commercial & Architectural Products, Inc., Dover, Ohio

[21] Appl. No.: 519,798

[22] Filed: May 7, 1990

Related U.S. Application Data

[62] Division of Ser. No. 369,639, Jun. 21, 1989, Pat. No. 4,937,992.

[51] Int. Cl.[5] .............................................. B23C 3/00

[52] U.S. Cl. .................................... 409/131; 144/371

[58] Field of Search ............... 409/131, 132, 138, 157, 409/175, 177, 182, 184; 144/368, 370, 371, 367, 363, 359, 360, 358; 51/281 R, 326; 52/316; 428/49, 167

[56] References Cited

U.S. PATENT DOCUMENTS 3,087,269 4/1963 Hudson ........................... 144/368 X
4,198,182 4/1980 Green ................................. 409/132
4,969,380 11/1990 Halligan ............................. 409/157

*Primary Examiner*—William Briggs
*Attorney, Agent, or Firm*—Pearne, Gordon, McCoy & Granger

[57] ABSTRACT

A scored wall panel provides shallow grooves to simulate installed wall tile or the like. The shallow grooves are provided with an inner concave wall having a radius of curvature substantially exceeding the thickness of the panel and corners tangentially intersecting the inner wall having a radius of curvature substantially less than the thickness of the panel. The panel thickness varies from one location to another and the grooves are formed so that the variations in thickness of the panel do not cause variations in the width of the grooves. Further, the grooves are sufficiently shallow so that the material of the panel extending past the groove maintains necessary panel strength. The edges of the radiused corners remote from the inner surface of the grooves extend substantially perpendicular to the faces of the panel and are spaced from the rearward face of the panel by a distance substantially equal to the minimum thickness of the panel. The grooves provide surfaces substantially perpendicular to the panel faces extending from the front face to the adjacent edges of the radiused corners along those portions of the panel which have a thickness greater than the minimum thickness thereof. The panel is particularly suited where sanitation requires that the grooves can be easily and effectively cleaned, such as along kitchen and bathroom walls.

4 Claims, 1 Drawing Sheet

SCORED PANEL

This is a division, of application Ser. No. 07/369,639, filed June 21, 1989 Pat. No. 4,937,992.

BACKGROUND OF THE INVENTION

This invention relates generally to wall panels and the like, and more particularly to a novel and improved scored panel particularly useful where sanitation requires that the panel be easily and effectively cleaned.

PRIOR ART

Wall panels and the like are often scored or grooved to provide an aesthetically attractive appearance. For example, grooves are provided in some panels to provide the appearance of installed wall tile. In some instances, the grooves are pressed into the panel surface during the manufacture. In other instances, the grooves are produced with cutters which cut away the panel material to produce the grooves.

If the panels have a uniform thickness along the entire panel, a groove cut into the panel surface to a uniform depth has a uniform width even if the groove is contoured to provide rounded or angled sides. However, when the thickness of the panel varies from one panel location to another, grooves cut into the panel having rounded or angled sides do not have a uniform groove width.

Further, when the panel is thin, difficulty is encountered in cutting uniform grooves without creating excessive panel weakness. With thin panels, such grooves must be shallow so that the panel material extending past the groove provides adequate panel strength.

SUMMARY OF THE INVENTION

In accordance with one aspect of the present invention, a novel and improved scored panel is provided in which the panel provides grooves of substantially uniform width and wherein the grooves are contoured so that they can be effectively cleaned.

In accordance with another aspect of the invention, a novel and improved method is provided for forming such scored panels.

The illustrated panel is fiber-reinforced plastic which varies in thickness from one panel location to another panel location. Shallow grooves are cut in the front face of the panel to an inner extremity which is uniformly spaced from the back face of the panel. The spacing between the inner extremities of the grooves and the back face of the panel is sufficient to maintain adequate panel strength.

The grooves are contoured or shaped to avoid corners which are difficult to clean. Therefore, the panel is particularly suited for use in kitchens, bathrooms, and other locations where sanitation requires surfaces which can be effectively and easily cleaned.

Further, the groove is contoured so that variations in the thickness of the panels do not result in variations in the width of the groove. The preferred groove contour includes an inner or bottom wall having a relatively large radius of curvature tangentially joining radiused corners having a substantially smaller radius of curvature. The grooves provide a smoothly curved surface which is attractive in appearance and which can be easily and effectively cleaned.

The edges of the radiused corner portions along the sides of the groove are spaced from the back face of the panel by a distance substantially equal to the minimum thickness of the panel. At locations in the panel of greater thickness than the minimum thickness, such edges of the radiused corners are spaced back from the front panel face and groove wall portions substantially perpendicular to the panel faces extend between the radiused corners and the front face of the panel. Such structure results in uniform groove width even though the thickness of the panel varies, causing variation in the groove depth.

With this invention, a panel is provided which has attractive, easily cleaned grooves formed therein. Such panel is particularly suited for use in installations where sanitation is of particular importance.

These and other aspects of the invention are illustrated in the accompanying drawings and are more fully described in the following specification.

DETAILED DESCRIPTION OF THE DRAWINGS

Figure 1:
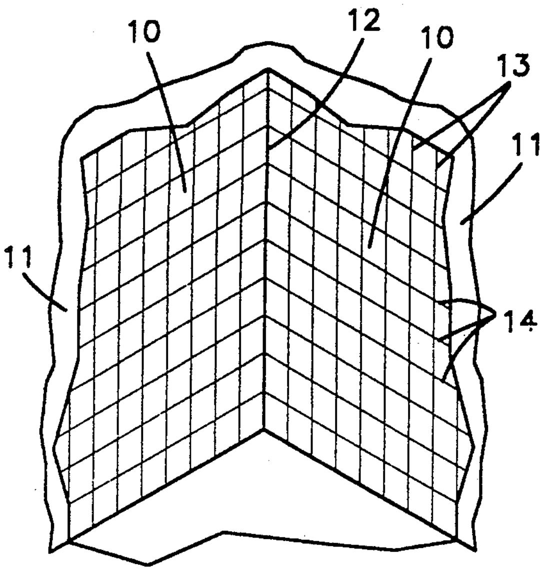
FIG. 1 is a fragmentary, perspective view illustrating panels in accordance with this invention providing the interior wall surfaces of a room.

FIG. 1 illustrates a room corner in which panels 10 in accordance with the present invention are installed on the walls 11 which intersect at a corner 12. The panels illustrated are formed of thin, fiber-reinforced plastic (normally referred to as "fiber glass"). The panels 10 have been scored to provide arrays of laterally spaced, vertically extending grooves 13 and vertically spaced, horizontally extending grooves 14. The illustrated arrays of grooves 13 and 14 produce squares which simulate installed wall tile and the grooves themselves simulate the grouted joints between such tile.

It should be understood that the panels in accordance with the present invention can be scored in other patterns to produce other aesthetically desirable effects, and that the invention is not limited to the production of panels which simulate installed wall tile or, for that matter, are not limited to wall panels per se.

Figure 2:
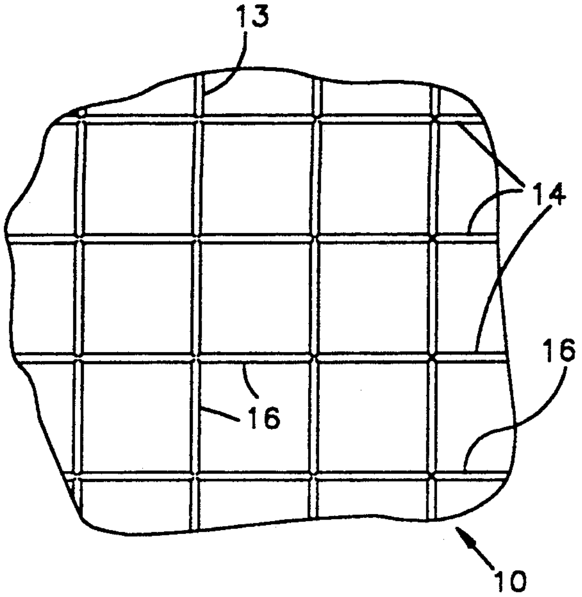
FIG. 2 is an enlarged, fragmentary view of one of the panels illustrated in FIG. 1.
Figure 3:
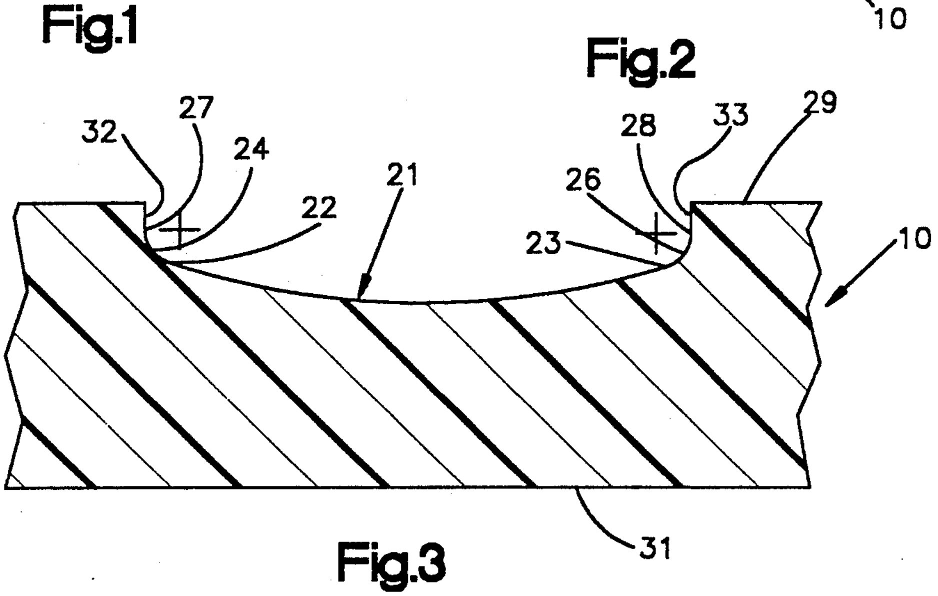
FIG. 3 is a greatly enlarged cross section illustrating the preferred contour of the groove.
Figure 4:
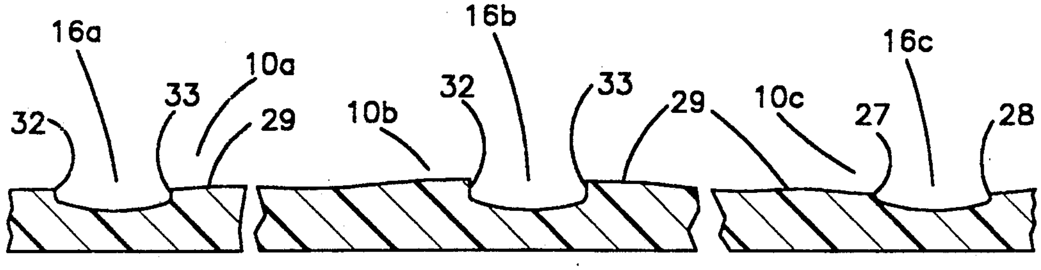
FIG. 4 is a broken cross section illustrating the shape of groove formed in panels at locations of varying thickness between a minimum thickness and a maximum thickness.

Referring now to FIGS. 2 through 4, the grooves of the vertical and horizontal arrays 13 and 14 are identical to grooves 16. Also, the panel 10 is preferably provided with a front face which has an attractive surface pattern and appearance. For example, the panels may provide a front face which simulates clay tile or other types of material such as marble, etc., so that a wall on which the panel is installed will provide a simulated wall of ceramic tile or other aesthetically attractive appearances.

When producing scored panels by cutting grooves into the panels, the finished, scored panel must maintain sufficient strength at the groove locations to prevent fracturing of the panels during normal production, storage, shipment and installation. When the panel is quite thin, this requires that the grooves themselves be quite shallow. Also, it is important to provide a structure in which the width of the grooves remains substantially constant. This can present a problem when the thickness of the panel varies from one location to another, either because of the inability to produce panels which are of uniform thickness or because the surface texture of the panel in itself creates variations in panel thickness.

Still further, it is important that the grooves do not provide sharp corners which can collect dirt and other debris and which are difficult to clean. This is particularly important where the panel is used in kitchens, bathrooms, and the like.

In accordance with the present invention, all of these problems are avoided even when the panel is quite thin. In the illustrated embodiment, the panels are fiber-reinforced plastic having a nominal thickness of seventy thousandths of an inch (0.070 inch) and a variation in thickness of ±seven thousandths of an inch (0.007 inch). The grooves formed in the panel have a uniform width of one-eighth of an inch (0.125 inch). In order to maintain panel strength, the illustrated panel provides a minimum thickness of panel material beneath the grooves of about forty-six thousandths of an inch (0.046 inch). In this illustrated example, such minimum thickness below the grooves 16 is substantially more than fifty per cent of the nominal panel thickness and the strength of the panel is sufficient to meet the above-mentioned strength criteria. By providing such minimum thickness past the groove which substantially exceeds fifty per cent of the panel thickness, sufficient panel strength is provided even when manufacturing tolerances cause grooves of slightly greater depth.

In order to ensure that the groove width is uniform in spite of the fact that the panel has variations in thickness, a groove structure, best illustrated in FIG. 3, is provided. Such groove provides a central inner wall portion 24 having a relatively large radius of curvature and which tangentially intersects corners formed with a relatively small radius of curvature. In the illustrated embodiment, the central inner wall portion 21 extends from about the location 22 to the location 23. At such locations, the central wall portion 21 tangentially intersects the associated of the radiused corners 24 and 26. The radiused corner 24 extends through an arc approaching 90 degrees from the location 22 to the opposite or forward edge 27 of the radiused corner 24. The radiused corner 26 similarly extends through an arc approaching 90 degrees from the location 23 to its opposite or forward edge 28. At the edges 27 and 28, the surfaces of the radiused corners are extending substantially perpendicular to the planes of the forward face 29 and rearward face 31 of the panel 10. Such edges 27 and 28 are spaced from the back face 31 of the panel a distance substantially equal to the minimum panel thickness, a distance of sixty-three thousandths of an inch (0.070 minus 0.007 inch). Therefore, the radiused corners 24 and 26 are substantially fully formed even in the zones of the panel of minimum thickness.

In zones along the panels in which the thickness of the panel exceeds the minimum thickness, the two radiused corners 24 and 26 join at their respective edges 27 and 28 with groove surfaces 32 and 33, respectively. Such surfaces 32 and 33 extend substantially perpendicular to the two panel faces 29 and 31.

In the illustrated embodiment, the radius of curvature of the central wall portion is about one hundred eighty-seven thousandths of an inch (0.187 inch) and the radius of curvatures of the two radiused corners 24 and 26 is about eight thousandths of an inch (0.008 inch). With such radiuses of curvature, the edges 27 and 28 are spaced from the back face 31 of the panel about sixty-three thousandths (0.063) of an inch when the minimum spacing between the grooves and the back face 31 is about forty-six thousandths (0.046) of an inch.

It is preferable to provide a curved surface along the inner wall portion 22 since the intersection of two grooves then provides a more realistic grout line appearance. Also, the strength of a panel formed with a curved inner wall surface tends to be stronger than a panel having a constant thickness past the groove with a substantially flat inner wall. However, in accordance with the very broadest aspects of this invention, the inner wall may be formed flat, if desired, and provided with radiused corners in the manner discussed above.

By providing the radiused corners formed of a relatively small radius, it is possible to form a shallow groove in relatively thin material and still provide a structure which can be effectively and easily cleaned and in which the width of the groove is maintained uniform even when the thickness of the panel varies from one location to another.

FIG. 4 illustrates the effect of thickness variations on the groove depth and shape. In the lefthand section of the figure, a panel portion 10*a* of nominal thickness, of seventy thousandths (0.070) of an inch, is illustrated. The central portion illustrates the panel portion 10*b* having a maximum thickness of seventy-seven thousandths (0.077) of an inch and the panel portion 10*c* illustrates a panel of minimum thickness of sixty-three thousandths (0.063) of an inch. The groove 16*a* along the portion of nominal thickness 41 provides a short wall portion 32 and 33 having a height of about seven thousandths (0.007) of an inch. In the portion 42 of maximum thickness, the height of the wall portions 32 and 33 is greater and equals about fourteen thousandths (0.014) of an inch. In the portion of minimum panel thickness 10*c*, the edges 27 and 28 are substantially at the face or front wall 29 and the wall portions 32 and 33 do not exist. A comparison of these various grooves 16*a*, 16*b*, and 16*c*, respectively formed in the three panel portions 10*a*, 10*b*, and 10*c*, establishes that the width of the groove is not noticeably affected by the variations in panel thickness and that a smoothly curved, shallow groove is provided. These shallow, smoothly curved grooves are easier to clean than deep grooves, so a panel incorporating the present invention is particularly suited for use in areas where sanitation is important.

The illustrated grooves 16 are preferably cut in the face of the panel by rotating cutters having the desired groove profile ground onto the cutter teeth.

When it is desired to produce a scored panel in which the face color of the panel is different from the color of the grooves, to provide a bicolored effect, panels are selected having material in the panel interior which differs from the face color.

Although the preferred embodiment of this invention has been shown and described, it should be understood that various modifications and rearrangements of the parts may be resorted to without departing from the scope of the invention as disclosed and claimed herein.

What is claimed is:

1. A method of producing scored panels from panels having front and back faces and having a minimum thickness along some locations and a maximum thickness along other locations, including cutting grooves in said front face having an inner wall and radiused corners along each side of said inner wall, providing a groove depth along said inner wall with an inner extremity spaced a uniform distance from said back face sufficient to maintain required panel strength, providing said radiused corners with a radius of curvature less than one-half said minimum thickness and edges remote from said inner surface extending substantially perpendicular to said back face and spaced therefrom by a distance substantially equal to said minimum thickness, and providing said grooves with a surface extending substantially perpendicular to said faces from said edges to said front face along portions of said panel having a thickness greater than said minimum thickness.

2. A method as set forth in claim 1, including forming said inner surface with a radius of curvature substantially greater than said maximum thickness.

3. A method as set forth in claim 2, including forming said inner surface so that said inner extremity thereof is spaced from said back face by a distance exceeding one-half said minimum thickness of said panel.

4. A method as set forth in claim 3, including cutting said grooves in said front face with cutters having cutter teeth contoured to conform to the contour of said grooves.

* * * * *